UNITED STATES PATENT OFFICE.

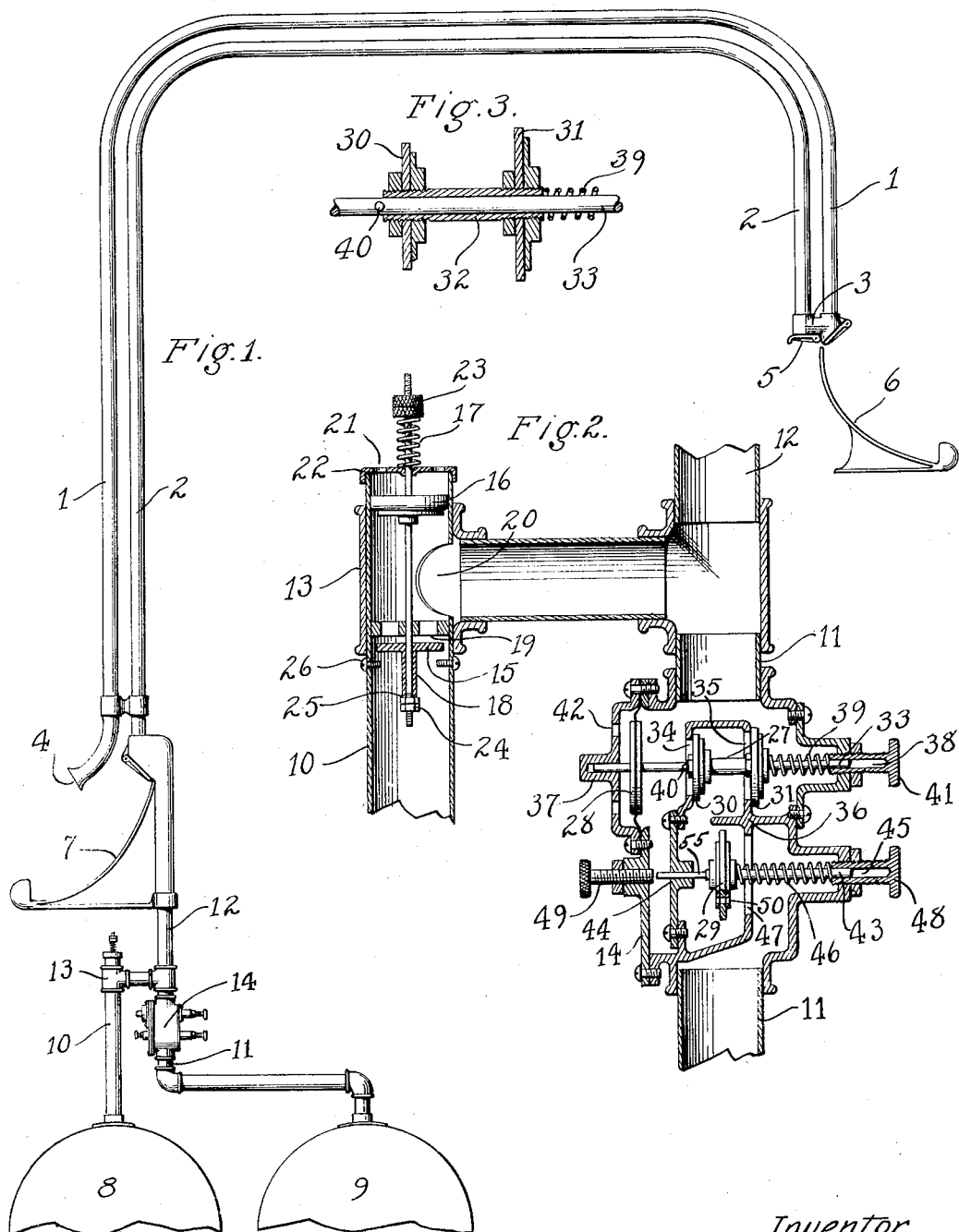

JOSEPH J. STOETZEL, OF CHICAGO, ILLINOIS, ASSIGNOR OF ONE-FOURTH TO PAUL F. CLAUSEN AND ONE-FOURTH TO FRANK NOVAK, BOTH OF CHICAGO, ILLINOIS.

REGULATING MECHANISM FOR PNEUMATIC CARRIER SYSTEMS.

1,385,727.  Specification of Letters Patent.  Patented July 26, 1921.

Application filed February 26, 1920. Serial No. 361,506.

*To all whom it may concern:*

Be it known that I, JOSEPH J. STOETZEL, a citizen of the United States of America, and a resident of Chicago, county of Cook, and State of Illinois, have invented certain new and useful Improvements in Regulating Mechanism for Pneumatic Carrier Systems, of which the following is a specification.

The main objects of this invention are to provide an improved pressure regulating mechanism for pneumatic carrier systems which is adapted to reduce to the lowest practicable minimum the amount of power required for idle and normal operation of the system, but which will provide for a substantial increase in the power immediately upon its being required for extra heavy or abnormal operation; to provide a regulating mechanism which is actuated automatically by the conditions in the line created by the character of the load; and to provide a regulating mechanism of this kind which is sufficiently sensitive to operate instantly with the changing conditions in the system to furnish either a small or a large amount of power as it is needed to properly operate the system.

An illustrative embodiment of this invention is shown in the accompanying drawings, in which—

Figure 1 is a diagrammatic view of a carrier system showing the manner in which an improved regulator of this kind is connected thereto.

Fig. 2 is an enlarged sectional detail of the regulating mechanism.

Fig. 3 is an enlarged sectional detail of one of the valve mechanisms for said regulator.

The carrier system which this improved regulator is designed to control is of the general vacuum or pressure type and is herein diagrammatically illustrated as comprising a pair of parallel transit tubes 1 and 2 connected together at 3 and provided respectively with the receiving terminals 4 and 5 and the delivery terminals 6 and 7.

This improved regulator is designed for use with two sources of power herein represented by pressure tanks 8 and 9 respectively connected by branch pipes 10 and 11 to the carrier system through a common pipe line 12. The sources of power 8 and 9 are of relatively different degrees, for example, the one being capable of producing a vacuum up to four inches, and the other being capable of producing a vacuum up to twenty-seven inches. Communication between these sources of power and the system is controlled by separate valve mechanisms arranged in housings 13 and 14 interposed in the pipes 10 and 11, which valve mechanisms are actuatable so that power from the source of lower degree, viz., tank 8, is provided for the idle and normal operation of the system, and power from the source of higher degree, viz., tank 9, is provided when needed for heavy or abnormal operation of the system.

The mechanism which controls communication between the tank 8 and the system comprises a valve 15, a piston 16 and a spring 17. The valve 15 is slidably mounted on a rod 18 rigidly connected to the piston 16 and is adapted to coact with a seat 19. The valve seat 19 is located in the pipe 10 inwardly of a port 20 formed in the side thereof, and the piston 16 is located on the opposite side and has one face thereof exposed to atmospheric pressure through apertures 21 formed in a cap 22 on the end of the pipe 10 and has the inner face thereof exposed to the pressure in the system. The spring 17 embraces the rod 18 and bears between the cap 22 and a pair of nuts 23 and normally urges the valve 15 toward the seat 19. The nuts 23 being adjustable along the rod 18 makes it possible to vary the tension of the spring 17 and accordingly regulate the shifting of the valve 15 under the action of the piston 16. A pair of nuts 24 arranged on the lower end of the rod 18 provide a shoulder 25 against which the valve 15 normally abuts. Studs 26 screwed into the sides of the pipe 10 are adapted to engage the valve 15 and limit its movement away from the valve seat 19.

The mechanism which controls communication between the tank 9 and the system comprises a balanced valve 27, a piston 28 and an auxiliary valve 29 arranged in the housing 14. The balanced valve 27 includes a pair of valve parts 30 and 31 rigidly but adjustably supported upon a sleeve 32 supported upon a rod 33, and are adapted to control alined openings 34 and 35 respectively, formed in a U-shaped partition 36 located in the housing 14. The rod 33 is supported in bearings 37 and 38 and carries the piston 28. A spring 39 normally urges the sleeve 32 against the pin 40 on the rod 33 so as to normally shift the parts 30 and 31 into position to close the openings 34 and 35 and also shift the piston 28 into the position shown in Fig. 2. The bearing 38 is formed in a headed pin 41 threaded into the housing 14 so as to adjust the tension of the spring 39.

The piston 28 as herein shown, is in the form of a diaphragm rigidly mounted on the rod 33 and having one face thereof exposed to atmospheric pressure through openings 42 and the other face exposed to the pressure in the system.

The valve 29 is connected to a rod 43 slidably supported in bearings 44 and 45 and is normally urged by a spring 46 into a retracted position with regard to the opening 47 formed in the partition 36. The bearing 45 is formed in a headed pin threaded into the housing 14 and adapted to adjust the tension of the spring 46. A headed pin 49 threaded into the housing 14 at the opposite side, forms an abutment for the rod 55 for adjustably limiting the movement of the valve 29 away from the opening 47.

The valve 29 is provided with an opening 50 extending therethrough which provides for a certain amount of communication between opposite sides of the valve when the opening 47 is closed, the purpose of which will more fully hereinafter appear.

The operation of the device herein shown is substantially as follows:

Suitable means are provided for establishing and maintaining a suitable force in the sources of power 8 and 9, which generally consists of a vacuum, in the one equal to about four inches, and in the other anything up to twenty-seven inches. The tension on the spring 17 is such that the piston 16 allows the valve 15 to be retracted slightly from the valve seat 19, as indicated in Fig. 2. This provides for a restricted communication between the source of power 8 and the system so long as the system remains idle and open. Upon the placing of a carrier into the line the admission of air into the system is cut off and the vacuum is built up in the system, with the result that the piston 16 under the influence of atmospheric pressure shifts the shoulder 25 downwardly, resulting in a further retraction of the valve 15 from the seat 19 and increasing communication between the source of power and the system. This change is substantially instantaneous and the carrier under the pressure of the atmosphere moves through the system to the delivery terminal. So long as the amount of power required to move the carrier is not in excess of the limit available from the source of power 8, the system will operate by the power supplied only from that source. When the carrier is discharged at the delivery terminal the resulting change in the system pressure causes the spring 17 to restore the valve 15 to its normal position for restricting communication through the pipe 10.

When, because of a number of carriers being placed in the line at the same time or because of the character of the load in a carrier or other conditions, power in excess of that available from the tank 8 is required to operate the system, the increase in vacuum built up in the system results in a shifting of the diaphragm 28 under the influence of atmospheric pressure and opens the balanced valve 27. Instantly the increased vacuum from the tank 9 results in a closing of the valve 15 so as to cut off communication between the sources of power, and an increased suction is produced in the system sufficient to continue the operation of the system.

As soon as the abnormal condition has been met and overcome the change in pressures results first in a closing of the valve 29 whereupon the spring 39 shifts the balanced valve 27 to close the openings 34 and 35. Communication between the system and the tank 9 being thus cut off the valve 15 again opens communication between the tank 8 and the system. At the same time the valve 29 is again retracted under the action of the spring 46 so that the regulator for tank 9 is once more ready to come into action when additional power is needed.

Although but one specific embodiment of this invention has been herein shown and described, it will be understood that numerous details of the construction shown may be altered or omitted without departing from the spirit of this invention as defined by the following claims.

I claim:

1. In a regulator for pneumatic carrier systems, the combination of separate pipes providing communication between a common header leading to the system and separate sources of power, valve mechanism located in each of said pipes between said header and the respective source of power and adapted for controlling such communication, separate means located within said pipes and directly connected to the respective valve mechanisms and independently actuatable automatically by variations in the system pressure for shifting the respective valve mechanisms, and other means for regulating said first-mentioned means, all being arranged so that the power required for the normal operation of the system is obtained from one source and power for abnormal operation of the system is obtained from the other source.

2. In a regulator for pneumatic carrier systems, the combination of separate pipes providing communication between a common header leading to the system and separate sources of power, valve mechanism located in each of said pipes between said header and the respective source of power and adapted for controlling such communication, separate means located within said pipes and directly connected to the respective valve mechanisms and independently actuatable automatically by the differences in the system and atmospheric pressures for shifting the respective valve mechanisms, and other means for regulating said first-mentioned means, all being arranged so that the power required for the normal operation of the system is obtained from one source and power for abnormal operation of the system is obtained from the other source.

3. In a regulator for pneumatic carrier systems, the combination of separate pipes providing communication between the system and separate sources of power, valve mechanism in each of said pipes adapted to control the communication of said sources of power with said system, means normally urging the valve mechanism in one of said pipes into position to restrict communication between the corresponding source of power and the system, mechanism connected to said valve mechanism and adapted to be automatically actuated for shifting said valve mechanism so as to increase the aforesaid communication when power is required by the system, other means normally urging the valve mechanism in the other said pipe into position to close communication between the corresponding source of power and the system, and other mechanism connected to the latter valve mechanism and adapted to be automatically actuated for shifting said latter valve mechanism and opening communication between said other source of power and the system when power in excess of that available from said one source of power is required to maintain the operation of the system.

4. In a regulator for pneumatic carrier systems, the combination of separate pipes providing communication between the system and separate sources of power, valve mechanism in each of said pipes adapted to control the communication of said sources of power with said system, means normally urging the valve mechanism in one of said pipes into position to restrict communication between the corresponding source of power and the system, a piston connected to said valve mechanism and having one face thereof exposed to atmospheric pressure and the other to the pressure in the system and being adapted to be operated by the relative differences in said pressures so as to shift said valve mechanism to increase the aforesaid communication when power is required by the system, other means normally urging the valve mechanism in the other side pipe into position to close communication between the corresponding source of power and the system, and a second piston connected to the latter valve mechanism and having one face thereof exposed to atmospheric pressure and the other to the pressure in the system and being adapted to be actuated by the relative differences between said pressures so as to shift said latter valve mechanism and open communication between said other source of power and the system when power in excess of that available from said one source of power is required to maintain the operation of the system.

5. In a regulator for pneumatic carrier systems, the combination of separate pipes providing communication between the system and separate sources of power, one of said pipes having a radially disposed port formed therein connected with the system, a valve seat located in said pipe at one side of said port, a valve shiftably mounted in said pipe and adapted to coact with said valve seat for controlling the communication between the corresponding source of power and the system, means normally urging said valve into a position to restrict such communication, a piston located in said pipe on the opposite side of said port and connected to said valve, said piston having one face thereof exposed to atmospheric pressure and the other to the pressure in said system and being shiftable by the relative differences in said pressures so as to move said valve against the action of said means for the purpose of increasing communication between the corresponding source of power and the system, valve mechanism located in the other said pipe, other means normally urging the valve mechanism in said other pipe into position to close communication between the corresponding source of power and the system, and mechanism connected to said valve mechanism and adapted to be automatically actuated for shifting of said valve mechanism to open communication between said other source of power and the system when power in excess of that available from said one source of power is required to maintain the operation of the system.

6. In a regulator for pneumatic carrier systems, the combination of separate pipes providing communication between the system and separate sources of power, one of said pipes having a radially disposed port formed therein connected with the system, a valve seat located in said pipe at one side of said port, a valve shiftably mounted in said pipe and adapted to coact with said valve seat for controlling the communication between the corresponding source of power and the system, means normally urging said valve into a position to restrict such communication, a piston located in said pipe on the opposite side of said port and having one face thereof exposed to atmospheric pressure and the other to the system pressure and being shiftable by the relative differences in said pressures for controlling the opening of said valve, a rod rigidly connected to said piston and slidably supporting said valve, whereby said valve and piston are relatively shiftable, a shoulder on said rod against which said valve normally abuts, shoulders on said pipe adapted to limit the movement of said valve away from said valve seat, valve mechanism located in the other said pipe, other means normally urging the valve mechanism in said other pipe into position to close communication between the corresponding source of power and the system, and mechanism connected to said valve mechanism and adapted to be automatically actuated for shifting of said valve mechanism to open communication between said other source of power and the system when power in excess of that available from said one source of power is required to maintain the operation of the system.

7. In a regulator for pneumatic carrier systems, the combination of separate pipes providing communication between the system and separate sources of power, one of said pipes having a radially disposed port formed therein connected with the system, a valve seat located in said pipe at one side of said port, a valve shiftably mounted in said pipe and adapted to coact with said valve seat for controlling the communication between the corresponding source of power and the system, a spring normally urging said valve into a position to restrict such communication, a piston located in said pipe on the opposite side of said port and connected to said valve, said piston having one face thereof exposed to atmospheric pressure and the other to the pressure in said system and being shiftable by the relative differences in said pressures so as to move said valve against the action of said spring for the purpose of increasing communication between the corresponding source of power and the system, valve mechanism located in the other said pipe, means normally urging the valve mechanism in said other pipe into position to close communication between the corresponding source of power and the system, mechanism connected to said valve mechanism and adapted to be automatically actuated for shifting of said valve mechanism to open communication between said other source of power and the system when power in excess of that available from said one source of power is required to maintain the operation of the system, and means for adjusting the tension of said spring so as to vary the sensitiveness of said piston to said differences in pressures.

8. In a regulator for pneumatic carrier systems, the combination of separate pipes providing communication between the system and separate sources of power, valve mechanism in one of said pipes adapted to control communication between the corresponding source of power and the system, a valve seat arranged in the other said pipe, a valve coacting with said valve seat for controlling communication between the corresponding source of power and the system, means normally urging said valve onto said seat to close such communication, and a piston rigidly connected to said valve and having one face thereof exposed to atmospheric pressure and the other to the system pressure and being shiftable by the relative differences in said pressures for opening communication between said corresponding source of power and the system when power in excess of that available from said first-mentioned source of power is required to maintain the operation of the system.

9. In a regulator for pneumatic carrier systems, the combination of separate pipes providing communication between the system and separate sources of power, valve mechanism in one of said pipes adapted to control communication between the corresponding source of power and the system, a valve seat arranged in the other said pipe, a valve coacting with said valve seat for controlling communication between the corresponding source of power and the system, a spring normally urging said valve onto said seat to close such communication, a piston rigidly connected to said valve and having one face thereof exposed to atmospheric pressure and the other to the system pressure and being shiftable by the relative differences in said pressures for opening communication between said corresponding source of power and the system when power in excess of that available from said first-mentioned source of power is required to maintain the operation of the system, and means for adjusting the tension of said spring so as to vary the sensitiveness of said piston to said differences in pressures.

10. In a regulator for pneumatic carrier systems, the combination of separate pipes providing communication between the system and separate sources of power, valve mechanism in one of said pipes adapted to control communication between the corresponding source of power and the system, a U-shaped partition arranged in the other said pipe and having a pair of alined openings formed therein, a pair of valves rigidly connected together and arranged to simultaneously control the opening and closing of said openings, means normally urging said valves to close said openings, and a piston rigidly connected to said valves and having one face thereof exposed to atmospheric pressure and the other to the pressure in the system and being shiftable by the relative differences in said pressures so as to move said valves against the action of said means for opening communication between the corresponding source of power and the system when power in excess of that available from said first-mentioned source of power is required to maintain the operation of the system.

11. In a regulator for pneumatic carrier systems, the combination of separate pipes providing communication between the system and separate sources of power, valve mechanism in one of said pipes adapted to control communication between the corresponding source of power and the system, a valve seat arranged in the other said pipe, a valve coacting with said valve seat for controlling communication between the corresponding source of power and the system, means normally urging said valve onto said seat to close such communication, a piston rigidly connected to said valve and having one face thereof exposed to atmospheric pressure and the other to the system pressure and being shiftable by the relative differences in said pressures for opening communication between said corresponding source of power and the system when power in excess of that available from said first-mentioned source of power is required to maintain the operation of the system, a second valve and coacting valve seat arranged in said other pipe between said first-mentioned valve and the source of power, and means normally urging said second valve into its retracted position, said second valve being adapted to be automatically shifted to close communication between said corresponding source of power and the system when the excess of power over that available from said first-mentioned source of power is no longer required to maintain the operation of the system, whereupon said first-mentioned valve may be restored to its normal position.

12. In a regulator for pneumatic carrier systems, the combination of separate pipes providing communication between the system and separate sources of power, valve mechanism in one of said pipes adapted to control communication between the corresponding source of power and the system, a U-shaped partition arranged in the other said pipe and having a pair of alined openings formed therein, a pair of valves rigidly connected together and arranged to simultaneously control the opening and closing of said openings, means normally urging said valves to close said openings, a piston rigidly connected to said valve and having one face thereof exposed to atmospheric pressure and the other to the pressure in the system and being shiftable by the relative differences in said pressures so as to move said valves against the action of said means for opening communication between the corresponding source of power and the system when power in excess of that available from said first-mentioned source of power is required to maintain the operation of the system, said partition having a third opening formed therein between said first-mentioned openings and the corresponding source of power, a valve adapted to control said third opening, means normally urging said valve into its retracted position, said valve being adapted to be automatically shifted to close said third opening when the excess of power over that available from said first-mentioned source of power is no longer required to maintain the operation of the system, whereupon said pair of valves may be restored to their normal positions.

13. In a regulator for pneumatic carrier systems, the combination of separate pipes providing communication between the system and separate sources of power, one of said pipes having a radially disposed port formed therein connected with the system, a valve seat located in said pipe at one side of said port, a valve shiftably mounted in said pipe and adapted to coact with said valve seat for controlling the communication between the corresponding source of power and the system, means normally urging said valve into a position to restrict such communication, a piston located in said pipe on the opposite side of said port and connected to said valve, said piston having one face thereof exposed to atmospheric pressure and the other to the pressure in said system and being shiftable by the relative differences in said pressures so as to move said valve against the action of said means for the purpose of increasing communication between the corresponding source of power and the system, a valve seat arranged in the other said pipe, a valve coacting with said second-mentioned valve seat for controlling communication between the corresponding source of power and the system, other means normally urging said second-mentioned valve onto said seat to close such communication, and a piston rigidly connected to said valve and having one face thereof exposed to atmospheric pressure and the other to the system pressure and being shiftable by the relative differences in said pressures for opening communication between the latter mentioned source of power and the system when power in excess of that available from said first-mentioned source of power is required to maintain the operation of the system.

14. In a regulator for pneumatic carrier systems, the combination of separate pipes providing communication between the system and separate sources of power, one of said pipes having a radially disposed port formed therein connected with the system, a valve seat located in said pipe at one side of said port, a valve shiftably mounted in said pipe and adapted to coact with said valve seat for controlling the communication between the corresponding source of power and the system, means normally urging said valve into a position to restrict such communication, a piston located in said pipe on the opposite side of said port and having one face thereof exposed to atmospheric pressure and the other to the system pressure and being shiftable by the relative differences in said pressures for controlling the opening of said valve, a rod rigidly connected to said piston and slidably supporting said valve, whereby said valve and piston are relatively shiftable, a shoulder on said rod against which said valve normally abuts, a valve seat arranged in the other said pipe, a valve coacting with said second-mentioned valve seat for controlling communication between the corresponding source of power and the system, means normally urging said second-mentioned valve onto said seat to close such communication, and a piston rigidly connected to said second-mentioned valve and having one face thereof exposed to atmospheric pressure and the other to the system pressure and being shiftable by the relative differences in said pressures for opening communication between said corresponding source of power and the system when power in excess of that available from said first-mentioned source of power is required to maintain the operation of the system.

15. In a pneumatic carrier system, the combination of a transit tube having receiving and delivery terminals, two separate sources of power of relatively different degrees, a branch pipe connecting each of said sources of power with said transit tube, valve mechanism in each of said branch pipes, and separate means located wholly within each of said branch pipes for controlling said valve mechanisms, said means coacting to normally provide power for said system from the source of lower degree and automatically supplement the same with power from the source of higher degree when needed to maintain the operation of said system.

16. In a pneumatic carrier system, the combination of a transit tube having receiving and delivery terminals, two separate sources of power of relatively different degrees, a branch pipe connecting each of said sources of power with said transit tube, valve mechanism in each of said branch pipes, means located in one of said branch pipes and directly subjected to the relative differences in the system and atmospheric pressures for actuating the valve mechanism in one of said pipes so as to normally provide power for said system from the source of lower degree, and other means located within the other said branch pipe also directly subjected to relative differences in the system and atmospheric pressures for actuating the valve mechanism in the other said pipe to provide power from the source of higher degree when power in excess of that available from said first-mentioned source is required to maintain the operation of the system.

Signed at Chicago this 24th day of February, 1920.

JOSEPH J. STOETZEL.